Figure 1:
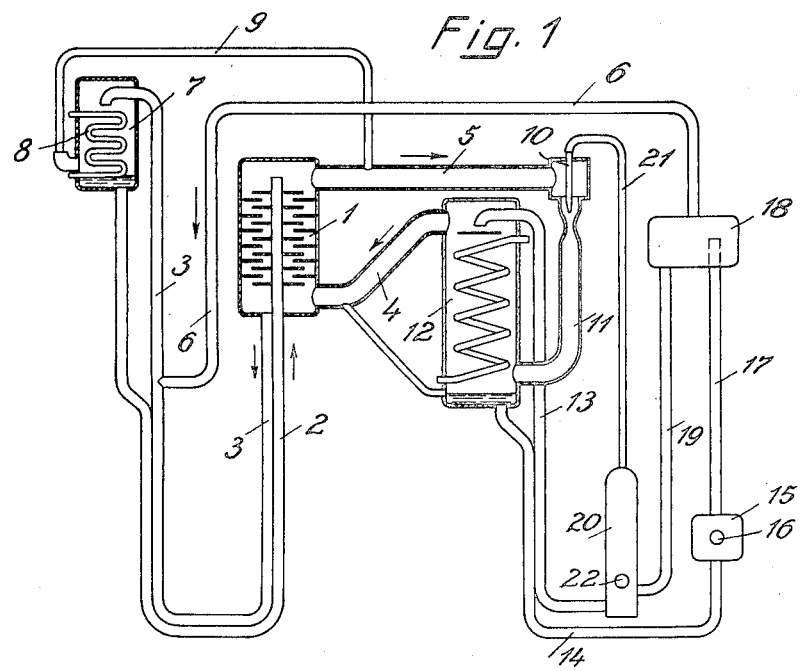

June 24, 1930.  E. ALTENKIRCH  1,767,639
ABSORPTION MACHINE
Filed Oct. 27, 1927  3 Sheets-Sheet 2

K = gas expeller
G
G₁ } = separator
G₂
A = absorber
R = reabsorber
E = degasifier
D = nozzle gas generator
— cooler, more concentrated solution
— warmer, less concentrated solution
— working medium (vapor)
--- gas bubbles
--- gas mixture Inventor
Edmund Altenkirch
by Knight Bro
Attorneys June 24, 1930.  E. ALTENKIRCH  1,767,639
ABSORPTION MACHINE
Filed Oct. 27, 1927  3 Sheets-Sheet 3

Inventor
Edmund Altenkirch
by Knight Bro
Attorneys

Patented June 24, 1930

1,767,639

UNITED STATES PATENT OFFICE

EDMUND ALTENKIRCH, OF ALT-LANDSBERG-SUD, GERMANY, ASSIGNOR TO SIEMENS-SCHUCKERTWERKE AKTIENGESELLSCHAFT, OF BERLIN-SIEMENSSTADT, A CORPORATION OF GERMANY

ABSORPTION MACHINE

Application filed October 27, 1927, Serial No. 229,074, and in Germany October 30, 1926.

My invention refers to absorption machines such as are used for instance for refrigeration, and more especially to a machine of the kind in which the expelled and liquefied refrigerant is evaporated in a chamber (hereinafter referred to as degasifier) containing an inert non-absorbable gas. In such machines the refrigerant is extracted from the mixture of gases by re-absorption. Machines of this kind have been suggested, in which circulation of the inert gas between the degasifier and the absorber is generated by means of a jet nozzle supplied with gas under pressure.

The present invention refers to absorption machines of this kind in which the gaseous refrigerant is developed in the degasifier from an absorption liquid, by which it had been absorbed in another vessel called reabsorber.

The present application contains certain subject matter common to the following copending applications filed by me, wherein various features disclosed herein are claimed: Serial No. 14,572, filed March 10, 1925, for absorption machines; Serial No. 99,890, filed April 5, 1926, for absorption machines; and Serial No. 101,745, filed April 13, 1926, for absorption machines. These applications were copending with and, as to common subject matter, relate back to my application Serial No. 7,696, filed February 7, 1925 (now Patent No. 1,615,353 of January 25, 1927), for absorption method and apparatus.

According to the present invention the gas to be supplied to the jet nozzle is generated at another point of the system than the gas which is absorbed by the absorption liquid in the re-absorber. I hereby obtain the advantage that I can thus place the gas supplied to the nozzle under higher pressure without an increase in size of the machine. For in absorption machines of this kind which operate without any mechanically actuated pump, pressure above normal can easily be generated by means of liquid columns, and a gas developer in which only the comparatively small quantity of gas required by the nozzle shall be generated, can easily be arranged, without any increase in size of the machine, in such manner that the pressure prevailing within the developer is higher than the pressure in the expeller. Apart therefrom a richer absorption solution can be used for developing the gas to be supplied to the nozzle in a device according to this invention, whereby the advantage is obtained, that heat energy having a lower temperature is required for developing the gas, no separate source of heat being required therefor, and the waste heat, which is available in the machine without any extra expense, will do all the heating required for developing this gas.

In the drawings affixed to this specification and forming part thereof three machines embodying my invention are illustrated diagrammatically by way of example.

In the drawings,

Fig. 1 is a diagram showing the first of these machines,

Fig. 1ª illustrating in a diagrammatic manner the liquid and gas circulation in this machine.

Figure 2:
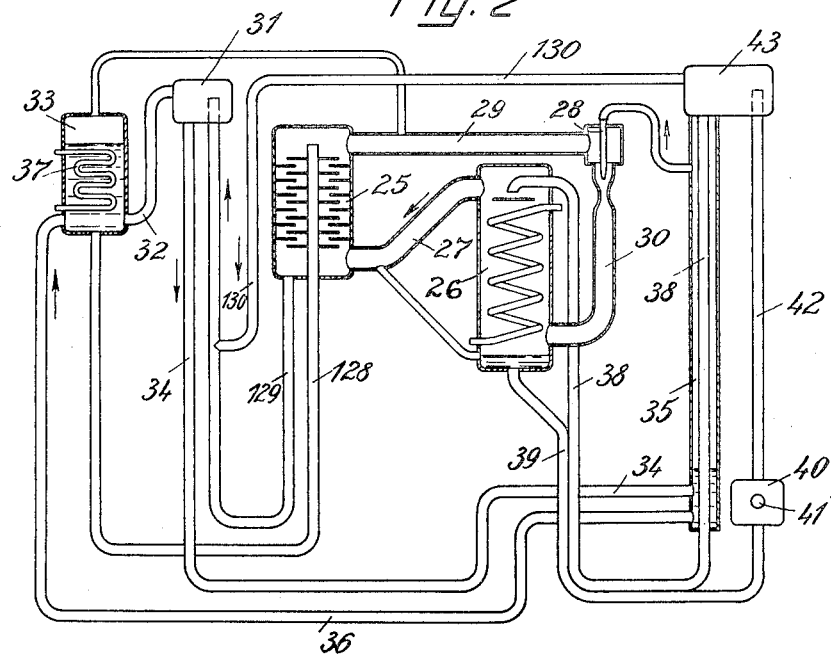
Figure 1A:
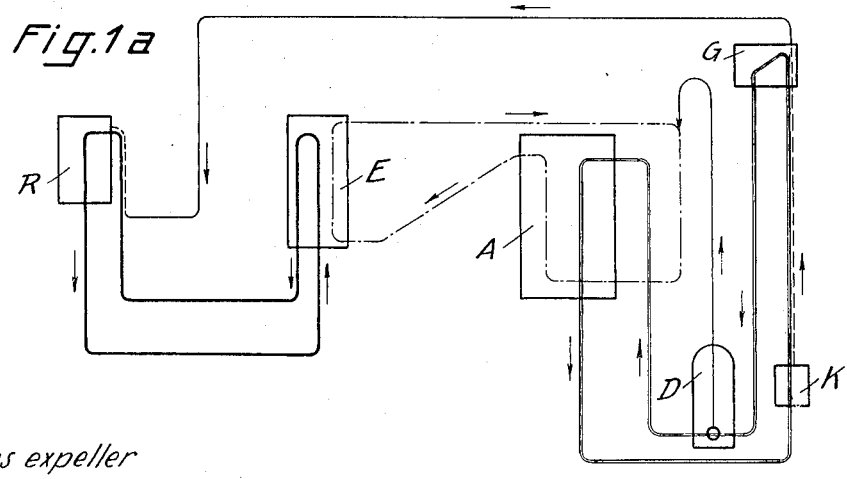
Figure 2A:
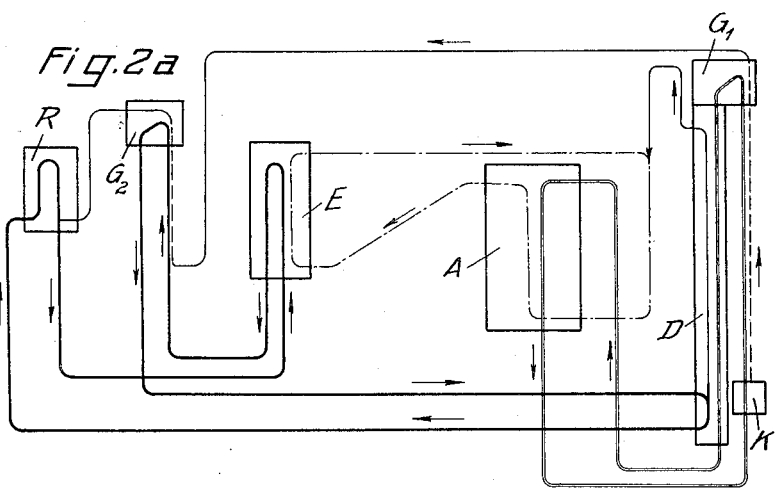
Figure 3A:
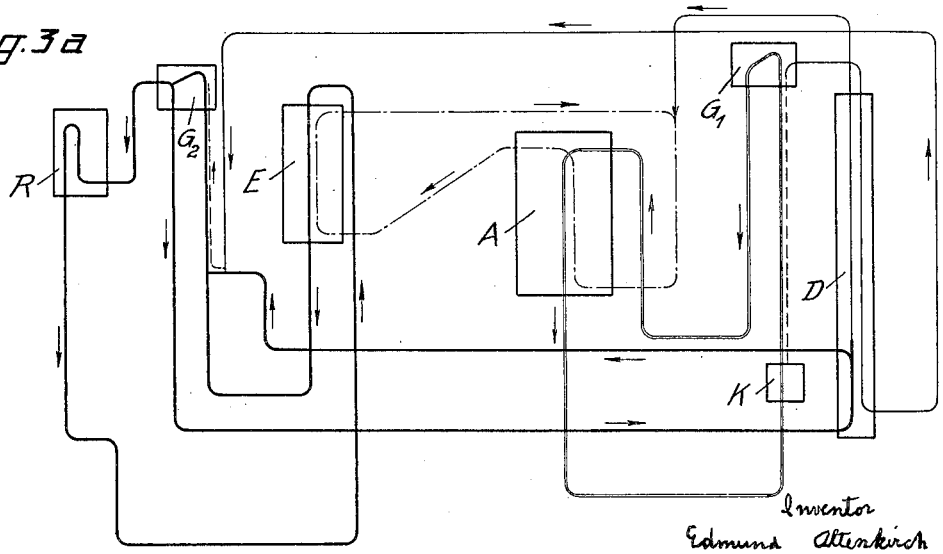
Figure 3:
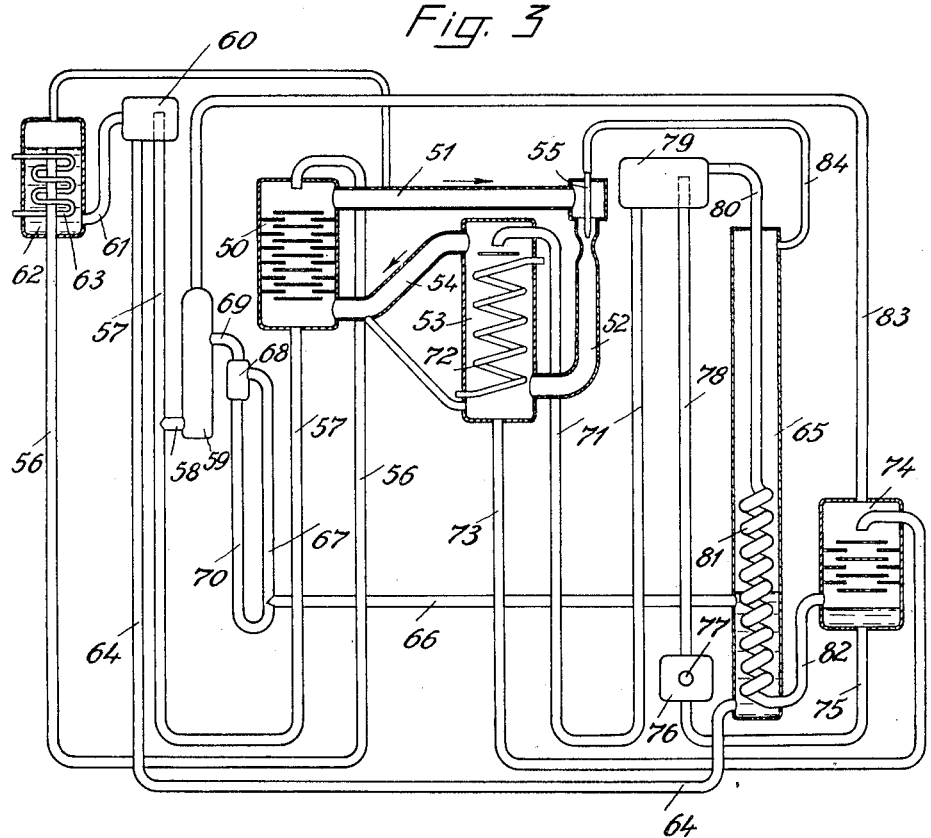
Figure 4:
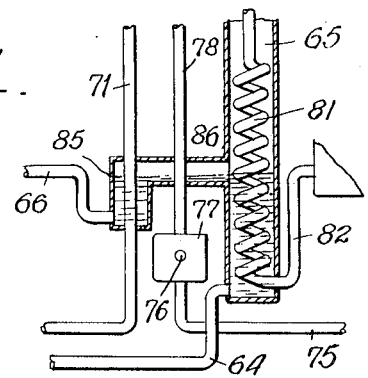

Figs. 2 and 3 are diagrams, according to Fig. 1, of the two other machines,

Figs. 2ª and 3ª illustrate the gas and liquid circulation in the second and third machine, respectively, similar to Fig. 1ª, and Fig. 4 represents a modified manner of developing gas for the nozzle 55 in Fig. 3.

In all the machines shown in the drawings two bodies of absorption liquid are arranged for separate circulation, one of which, being warmer, but less concentrated than the other, circulating through the expeller (boiler) and the absorber, while the cooler and more concentrated one circulates through the degasifier and reabsorber.

I will now first proceed to describe the circulation of the gas and liquid in the three systems, before describing the construction of these machines more in detail.

In the machine shown in Fig. 1 the gas required for the jet nozzle is recovered from the less concentrated solution, as shown in Fig. 1ª, where A is the absorber, K the expeller (boiler), G a gas separator, D the nozzle gas generator, E the degasifier and R the re-absorber.

In the machines shown in Figs. 2 and 3 on the other hand the gas for the nozzle is developed from the more concentrated solution as shown in Figs. 2ª and 3ª respectively, where A is the absorber, K the expeller, D the nozzle gas generator, E the degasifier and R the reabsorber, while $G^1$ is the gas separator of the absorber system and $G^2$ a separate gas separator inserted in the reabsorber system.

The heat required for developing the gas for the nozzle is supplied in the machine shown in Figs. 1 and 1ª by an electrical heating resistance, while in the machine shown in Figs. 2 and 2ª it is supplied by the liquid circulating in the absorber system, and in the machine shown in Figs. 3 and 3ª by the gaseous refrigerant developed from this liquid.

The diagrams shown in Figs. 1ª, 2ª and 3ª also illustrate the circulation of the gaseous refrigerant, part of which is used for feeding the jet nozzle, and of the mixture of the refrigerant with an inert gas.

Referring now to Fig. 1, 1 is the degasifier, in which the temperature reduction is accomplished. Rich absorption liquid is supplied to the degasifier by means of pipe 2 which liquid escapes through pipe 3. An inert gas enters through tube 4, flows through the degasifier 1 in upward direction and escapes through tube 5. The absorption liquid, which is now poorer in refrigerant, is conveyed upwardly in the ascending branch of pipe 3 by means of gaseous refrigerant supplied through pipe 6 and enters the re-absorber 7, in which the gas is absorbed by the liquid. The liberated heat of absorption is carried away by means of a cooler 8. Any gas which has not been absorbed, can escape through pipe 9 into the gas circulation tube 5. At the end of this tube is arranged a jet nozzle 10, from which gaseous refrigerant escapes under pressure to generate and maintain circulation of the gas mixture. This mixture is conducted through tube 11 into the absorber 12, in which it ascends to escape through tube 4. In the top part of the absorber 12 ends a pipe 13 which supplies the absorber with absorption liquid poor in gas. This liquid flows through the absorber in finely divided form and is conveyed through pipe 14 into the expeller (boiler), which is here shown as being heated by an electrical resistance 16. The gas bubbles which are here developed, carry the absorption liquid along in the ascending pipe 17 and into the gas separator 18, from which the gas flows through pipe 6 and ascending pipe 3 into the re-absorber 7, while the absorption liquid flows through pipe 19, gas developer 20 and pipe 13 back into the absorber 12. In the gas developer 20 I develop the gas which is supplied to the nozzle 10 through pipe 21. The gas developer 20 may for instance be heated also by means of an electrical resistance 22. The pressure in the developer is determined by the liquid column in pipe 13, the pressure in the expeller 15 by the column in pipe 14. Pipe 13 being longer than pipe 14, the pressure in the developer 20 will be greater. Apart therefrom the developer can also be arranged near to the lowest point of the machine than the expeller 15 so that also for this reason the pressure obtainable will be higher without any increase in size of the machine. The quantity of gas developed in the developer 20 is regulated automatically. If more gas escapes from the nozzle than is developed in the developer, the liquid in the developer 20 rises and covers a greater part of the surface of the heating resistance 22. On the other hand, if an excessive quantity of gas is developed, the liquid is displaced from the developer 20 until the heating surface of the resistance is free of any liquid. In consequence of this arrangement the liquid level in the developer will adjust itself automatically in such manner that at all times that portion of the heating surface of the resistance is covered with liquid which is required for developing the gas to be supplied to the nozzle.

In the machine illustrated in Fig. 2 the mixture of inert gas and gaseous refrigerant circulates through the degasifier 25, circulation tube 29, past jet nozzle 28, through tube 30, absorber 26 and tube 27 back to the degasifier 25, which is supplied with rich solution through pipe 128, while poor solution escapes through pipe 129, in the ascending branch of which it is lifted by the gas entering through pipe 130. The gas and the solution are thus carried into a gas separator 31, from which the gas flows into the re-absorber 33 through pipe 32 while the liquid flows through pipe 34 into the gas developer 35 and further through pipe 36 into the re-absorber 33 to absorb the gas therein. The heat of absorption is carried away by the cooler 37.

The absorber 26 is supplied with poor solution through pipe 38, while rich solution flows from the absorber 26 through pipe 39 into the expeller 40, which is here shown to be heated by a heating resistance 41. The gas and liquid flow from the ascending pipe 42 into the gas separator 43, from which the solution, freed from gas, returns through pipe 38 into the absorber 26.

As shown in the drawing, pipe 38 through which flows the hot solution freed from gas, extends through the gas developer 35 and thus serves to heat same. As the solution circulating between the degasifier 25 and the re-absorber 33 is kept in a lower range of temperature, its concentration is considerably greater than that of the solution circulating between the expeller 40 and the absorber 26. In consequence thereof the temperature prevailing in pipe 38 suffices to produce a vigorous developing of gas in the developer 35. Also in this machine the liquid level in the developer automatically adjusts itself in such manner that the heating surface covered with liquid corresponds to the quantity of gas required by the nozzle. Thus no separate source of heat is here required for the production of the nozzle gas, the waste heat available in the machine being utilized for this purpose.

In the machine illustrated in Fig. 3 the gas mixture circulates in the degasifier 50, tubes 51, 52, absorber 53, and tube 54, the jet nozzle 55 serving to keep the mixture circulating. The degasifier 50 is supplied with rich solution by pipe 56, the poor solution escapes through pipe 57, in the ascending branch of which ends a pipe 58 connected with a gas collector 59. The gas entering the pipe 57 from this collector serves for lifting the liquid into the vessel 60, from which the gas and the greatest part of the liquid flow through pipe 61 into the re-absorber 62, in which the cooler 63 serves for withdrawing the heat of absorption. A comparatively small part of the absorption liquid flows from the vessel 60 through pipe 64 into the gas developer 65 from which it flows through pipes 66, 67, the small gas separator 68 and pipe 69 into the collector 59 and through pipe 58 into the ascending pipe 57, where the solution is again carried along into the vessel 60 by the gas entering this pipe. To the gas separator 68 is connected a pipe 70, which is combined with pipe 67 to form a U-shaped tube, the purpose of which will be described later on. The absorber 53 is supplied with poor solution through pipe 71, a cooler 72 serving for carrying away the heat of absorption. The enriched solution flows through pipe 73 into a rectifying apparatus 74 and having collected in its bottom part escapes through pipe 75 into the expeller 76, where it is heated by a heating resistance 77. The gas bubbles which are here developed, carry the solution along in the ascending pipe 78 and into the gas separator 79, while the poor solution flows through pipe 71 back into the absorber 53. The gas flows through pipe 80 into a coiled pipe 81 arranged in the developer 65 and escapes through pipe 82 into the rectifying apparatus 74, in which it flows in countercurrent to the solution which trickles down therein, whereupon the gas flows through pipe 83 into the collector 59. The gas flowing through the coil 81 transmits its excess heat as well as the heat of condensation of the vapour of the absorbent, which had been carried along in it, to the ambient liquid, which, being thus heated, is freed from gas, which enters the nozzle 55 through pipe 84.

In the machine shown in Fig. 3 the heat of condensation of the absorbent evaporated during the expulsion is utilized in the first place for generating the gas required in the jet nozzle, so that at the same time the gas expelled is also dried. The liquid absorbent which may have been condensed in the coiled pipe 81, is carried along by the vapour through pipe 82 into the rectifying apparatus 74, where the condensate is returned into the liquid circulation, while the vapour is further dried by the well known rectification effect.

The pipe 66 is connected with the developer 65 as close as possible to the liquid level therein, in order to prevent stagnation of part of the liquid. It may therefore happen that, if the liquid level should sink temporarily, gas might enter the ascending pipe 67 through pipe 66 whereby the gas might be caused to expel the liquid column in this pipe so that the pressure required within the gas developer 65 would be lost. To prevent this I have inserted a small gas separator 68 in which such quantities of liquid, as may have been carried up through pipe 67, are separated from the gas and in dropping through pipe 70 at once fill the pipe 67 so that the required liquid column is always maintained in this pipe.

The quantity of liquid branched off in the vessel 60, which flows through pipe 64 into the developer 65, is dependent from the resistance offered in the pipes 64, 66, 67 and from the level, at which the liquid enters through pipe 69 into the vapour collector 59. For the entire circulation system forms a U-shaped tube, one branch of which acts in favour of the circulation, while the other branch acts counter to it. Therefore the higher this latter branch, the smaller will be the quantity of liquid in circulation. It is therefore easy for the designer to correctly determine the quantity of liquid branched off and serving for developing the gas required by the nozzle.

If the quantity of heat available in the expelled vapour or the quantity of heat stored in the degasified solution should not suffice to develop the gas required in the nozzle, the mode of heating illustrated in Fig. 2 may be combined with that shown in Fig. 3. This modification is illustrated in Figure 4, with reference to the general arrangement otherwise shown in Figure 3.

The gas developer 65, whose liquid content is heated by means of pipe coil 81 through which the gaseous working medium passes, as described hereinbefore, is provided in Figure 4 with a horizontal arm which has a downward extension 85. To this extension is connected the pipe 66 which returns the absorption solution to the reabsorber 62 in Figure 3. (In Figure 3 this pipe 66 is directly connected to the vertical gas developer 65). In Figure 4 the pipe 71 through which the hot absorption liquid is discharged from the gas separator 79, is conducted through the downward extension 85 of the gas developer. Thus part of the absorption solution contained in the gas developer, respectively in the extension 85, and from which the nozzle gas is developed, is heated in the manner shown at 35, 38 in Figure 2, the other part of the solution which is contained in the vertical portion 65 of the gas developer being heated by pipe coil 81 as shown in Figure 3. In the portion 85 the more gaseous working medium is developed for the nozzle the less the temperature of the vapor passing through coil 81 is sufficient to produce the necessary amount of nozzle vapor in the vertical portion 65 of the gas developer. The additional amount of gas developed in the extension 85 passes through the horizontal portion of this extension into the gas space of the vertical gas developer 65, whence it is supplied to the nozzle 55.

Preferably in all the machines here shown and described, heat exchanging devices are inserted between the poor and the rich solution. For the sake of clearness the possibility of heat exchange has been indicated in the drawings merely by the close juxtaposition of the respective pipes.

I claim:—

1. Absorption system comprising an absorption liquid, a working medium, an inert gas, an absorber and a re-absorber for said working medium, means for causing part of said working medium to create circulation of said inert gas, and means for liberating this part of said working medium separately from the remainder.

2. Absorption system comprising an absorption liquid, a working medium, an inert gas, an absorber and a re-absorber for said working medium, means for causing part of said working medium to create circulation of said inert gas, and means for liberating this part of said working medium separately from the remainder by means of waste heat available in the system.

3. Absorption system comprising an absorber, a re-absorber, a gas expeller, a degasifier, an absorption liquid, a working medium adapted to pass through said expeller, re-absorber, degasifier and absorber, said system containing an inert gas, means for causing part of said working medium to create circulation of said inert gas through said absorber and said degasifier, means for liberating this part of said working medium by means of waste heat available in the absorption liquid flowing from said expeller to said absorber, and separate means for liberating the remainder of said working medium.

4. Absorption system comprising an absorber, a re-absorber, a gas expeller, a degasified, an absorption liquid in circulation through said absorber, reabsorber, gas expeller and degasifier, said system containing an inert gas, means for causing part of said working medium to create circulation of said inert gas through said absorber and said degasifier, and separate means for liberating this part and the remainder of said working medium from the absorption liquid flowing between said liquefier and said degasifier.

5. Absorption system comprising an absorption liquid, a working medium, an inert gas, means for causing said working medium to create circulation of said inert gas, an absorber and a re-absorber for said working medium, means for causing part of said working medium to create circulation of said inert gas, and means for liberating this part of said working medium separately from the remainder, said liberating means comprising a vessel, means for feeding absorption liquid into the bottom part of said vessel and a heating surface adapted to be partly covered with such liquid in proportion to the quantity of working medium required for causing circulation of said inert gas.

6. Absorption system comprising an absorption liquid, a working medium, an inert gas, an absorber and a re-absorber for said working medium, means for causing part of said working medium to create circulation of said inert gas, and separate means for liberating this part and the remainder of said working medium, means being provided for maintaining higher pressure in the means for liberating the said part of said medium, than in the means for liberating the remainder.

7. Absorption system comprising two bodies of absorption liquid arranged for circulation in separate closed cycles, a working medium and an inert gas arranged for circulation in common in a closed cycle, means for developing gas from both of said bodies of liquid and means for causing gas developed from one of said bodies to keep said medium and gas circulating.

8. Absorption system comprising two bodies of absorption liquid containing different percentages of absorbed gas arranged for circulation in separate closed cycles, a working medium and an inert gas arranged for circulation in common in a closed cycle, means for developing gas from both of said bodies of liquid and means for causing gas developed from one of said bodies to keep said medium and gas circulating.

9. Absorption system comprising two bodies of absorption liquid containing different percentages of absorbed gas arranged for circulation in separate closed cycles, a working medium and an inert gas arranged for circulation in common in a closed cycle, means for developing gas from both of said bodies of liquid and means for causing gas developed from the richer one of said bodies to keep said medium and gas circulating.

10. Absorption system comprising an absorber, a re-absorber, a gas expeller, a degasifier, two bodies of absorption liquid one of said bodies circulating through said re-absorber and said degasifier and the other body circulating through said expeller and said absorber, a working medium adapted to pass through said expeller, re-absorber, degasifier and absorber, said system containing an inert gas, means for liberating part of said working medium in said expeller and a gas developer for liberating the remainder of said working medium from the body of absorption liquid flowing between said re-absorber and said degasifier by means of waste heat available partly in the body of absorption liquid flowing from said expeller to said absorber and partly in the working medium liberated in said expeller, both said liquid and said medium being in heat exchanging relation with said first named body of absorption liquid in said gas developer.

In testimony whereof I affix my signature.

EDMUND ALTENKIRCH.